(12) United States Patent
Zitaner et al.

(10) Patent No.: US 7,418,446 B2
(45) Date of Patent: Aug. 26, 2008

(54) SYSTEM AND METHOD FOR COLLECTING AND ANALYZING COMPETITIVE REWARDS DATA

(75) Inventors: Eric Zitaner, Valhalla, NY (US); Susan Haslett, Dallas, TX (US); Kathy Bensky, Philadelphia, PA (US)

(73) Assignee: Towers Perrin Forster & Crosby, Philadelphia, PA (US)

( * ) Notice: Subject to any disclaimer, the term of this patent is extended or adjusted under 35 U.S.C. 154(b) by 528 days.

(21) Appl. No.: 10/822,920

(22) Filed: Apr. 13, 2004

(65) Prior Publication Data

US 2004/0193494 A1 Sep. 30, 2004

Related U.S. Application Data

(63) Continuation of application No. 09/650,039, filed on Aug. 29, 2000, now Pat. No. 6,741,993.

(51) Int. Cl.
*G06F 17/30* (2006.01)
(52) U.S. Cl. .................. 707/10; 707/3; 707/104.1
(58) Field of Classification Search .......... 707/3, 707/9, 10, 102, 104.1
See application file for complete search history.

(56) References Cited

U.S. PATENT DOCUMENTS

| | | | |
|---|---|---|---|
| 5,600,554 A | 2/1997 | Williams | |
| 5,734,838 A * | 3/1998 | Robinson et al. | 705/14 |
| 5,819,231 A * | 10/1998 | Tremaine | 705/7 |
| 5,909,669 A | 6/1999 | Havens | |
| 5,924,072 A * | 7/1999 | Havens | 705/1 |
| 5,926,794 A | 7/1999 | Fethe | |
| 6,055,511 A * | 4/2000 | Luebbering et al. | 705/14 |
| 6,061,660 A | 5/2000 | Eggleston et al. | |
| 6,308,177 B1 | 10/2001 | Israni et al. | |
| 6,341,267 B1 | 1/2002 | Taub | |
| 6,385,620 B1 | 5/2002 | Kurzius et al. | |
| 6,411,939 B1 * | 6/2002 | Parsons | 705/35 |
| 6,434,533 B1 * | 8/2002 | Fitzgerald | 705/10 |
| 6,505,183 B1 | 1/2003 | Loofbourrow et al. | |
| 6,587,832 B1 | 7/2003 | Beck et al. | |
| 2001/0032185 A1 | 10/2001 | Masaki | |
| 2001/0032195 A1 * | 10/2001 | Graichen et al. | 705/400 |
| 2002/0022987 A1 | 2/2002 | Mahmood et al. | |
| 2002/0059264 A1 | 5/2002 | Fleming et al. | |
| 2002/0188542 A1 * | 12/2002 | Zhang et al. | 705/36 |
| 2003/0055717 A1 | 3/2003 | Badugu et al. | |

OTHER PUBLICATIONS

PCT International Application, Publication No. WO 99/04350 to O'Connor filed Jul. 16, 1998, published on Jan. 28, 1999.

* cited by examiner

*Primary Examiner*—Leslie Wong
(74) *Attorney, Agent, or Firm*—King & Spalding LLP

(57) ABSTRACT

The invention concerns a system and method for implementing and/or administering a competitive rewards database. Member data is received from at least one member computer via a data feed. The (raw) member data is automatically mapped and incorporated into the competitive rewards database. A data capture tool, preferably coupled to a data network, is operable to adjust the mapping of member data. A rewards workbench, preferably coupled to a data network, is generally operable to query the competitive rewards database.

25 Claims, 4 Drawing Sheets

Data Mapping Table (e.g., one per Member)

| Raw Data Element | Locations (bytes) | Database Element | Locations (bytes) |
|---|---|---|---|
| First Name | 01-20 | FName | 61-80 |
| Middle Name | 21-40 | MName | 81-100 |
| Last Name | 41-80 | LName | 101-120 |
| SS # | 81-90 | Employee ID | 121-130 |
| Position | 91-120 | Job_Code | 01-10 |
| Salary | 121-140 | Salary | 11-40 |
| Vacation (weeks) | 141-150 | VacTime | 41-50 |
| Sick Days (days) | 150-160 | SickTime | 51-60 |
| .... | | | |

Figure 4

SYSTEM AND METHOD FOR COLLECTING AND ANALYZING COMPETITIVE REWARDS DATA

RELATED APPLICATION

This application is a continuation of and claims priority under 35 U.S.C. § 120 to U.S. patent application No. 09/650,039, filed on Aug. 29, 2000 now U.S. Pat. No. 6,741,993 and entitled "Competitive Rewards Benchmarking System and Method," which is hereby fully incorporated herein by reference.

The present invention relates to the field of computer database systems and in particular relates to a competitive rewards benchmarking system and method.

Many business entities find it necessary to obtain, analyze and interpret worker rewards market data to better recruit and retain workers or "talent". Often, market pressures require business organizations to identify and retain the best qualified talent available, and ensure they are properly recognized and rewarded. However, several difficulties arise in carrying out this task.

Some business entities benchmark worker rewards against various competitors in such areas as: salary ranges, salary increases, paid/unpaid leave, retirement programs; medical, dental, vision care, insurance programs, alternate work schedules and the like. Effective benchmarking requires relatively large amounts of up to date and accurate data. For example, competitive rewards data is preferably gathered from multiple business organizations via surveys and the like for incorporation into a database. In general, surveys are quite labor intensive to administer and can include data gathered and compiled on a local, national or global basis.

Competitive rewards data can be compiled in-house or can be obtained from a variety of sources (out-sourced). A typical competitive rewards database contains: base salary information, incentives and total cash compensation as well as other factors such as use of overtime, stock plans and cash awards (like performance bonuses and profit sharing). Reports generated from such data can contain global or national salary information as well as breakouts based on numerous criteria, including sales revenue, geographic region, industry type, company size and the like.

Often, access to out-sourced data requires a business entity to pay a fee and also commit at least a portion of its resources to compile and submit its data regarding its workers. The preparation and submission of this information is also quite labor intensive. However, out-sourcing is advantageous in that the actual compilation, maintenance and administration of the database are handled by a third party.

The consistency and accuracy of the compiled data can be affected by various factors. For example, various worker roles may not be defined consistently between business organizations. The geographic location of various businesses may affect the magnitude and form of worker compensation packages. Country specific rewards and translating across currencies and cultures can add further inconsistencies in the data. Survey inconsistencies may also affect the accuracy of the gathered data.

What is needed in the art and provided by the invention are improved systems and methods for providing current competitive rewards data.

SUMMARY OF THE INVENTION

The invention concerns a system and method for implementing and/or administering a competitive rewards database. Member data is received from at least one ember computer via a data feed. The (raw) member data is automatically mapped and incorporated into the competitive rewards database.

In a preferred embodiment, the competitive rewards database contains at least one of base pay data, long term incentive pay data and annual incentive pay data. Other data elements can include any human resource management system data element, incentive data, perquisite data and/or benefit plan provision data. The competitive rewards database can also contain at least one calculated data value.

A preferred aspect of the invention is direct to a data capture tool operable to adjust the mapping of member data. Preferably, the data capture tool is coupled to a data network and is operable to provide remote access to at least a portion of the competitive rewards database.

Another aspect of the invention is directed to a rewards workbench operable to query the competitive rewards database. Preferably, the rewards workbench is coupled to a data network and is operable to provide remote access to at least a portion of the competitive rewards database (e.g., compiled statistics summarizing the data received from multiple members). In a preferred embodiment, the rewards workbench is operable to automate data feeds to at least one third party human resources management system.

The invention is also directed to a competitive rewards database system. The system has a competitive rewards database subsystem having a competitive rewards database and a data communications channel. The system has mapping data for automatically mapping member data prior to incorporation into the competitive rewards database. The system also includes at least one member computer system having a data feed coupled to the data communications channel.

In a preferred embodiment the system also has a data capture tool operable to adjust the mapping of member data. Preferably, the data capture tool is coupled to a data network and is operable to provide remote access to at least a portion of the competitive rewards database.

Another preferred aspect of the system provides a rewards workbench operable to query the competitive rewards database. Preferably, the rewards workbench is coupled to a data network and is operable to provide remote access to at least a portion of the competitive rewards database. The rewards workbench can optionally be operable to automate data feeds to at least one third party human resources management system.

BRIEF DESCRIPTION OF THE DRAWINGS

FIG. 4 is an exemplary data mapping table in accordance with the invention.

DETAILED DESCRIPTION OF THE INVENTION

Definitions

The following terms shall have, for the purposes of this application, the respective meanings set forth below.

Database: means a collection of information stored for later retrieval. Traditional databases are organized by fields, records, and files. A field is a single piece of information; a record is one complete set of fields; and a file is a collection of records. The term "database" is used herein in its broadest sense (i.e., a collection of information) and is not limited to any particular structure or implementation.

Data network: means a group of two or more computer systems linked together in data communication. The term "data network" encompasses any type of wired or wireless computer network, independent of protocol, including local-area networks (LANs), wide-area networks (WANs) and networks of networks including the an intranet, extranet and the Internet.

HTML: is an acronym for Hyper-Text Markup Language, the authoring language used to create documents on the World Wide Web. HTML defines the structure and layout of a Web document by using a variety of tags and attributes.

Link: means an HTML element that provides a Hyper-Text link. For example an HTML element supporting the HREF attribute which specifies a Hyper-Text link to another resource, such as an HTML document, image or the like.

Server: means a program running on a computer that provides some service to other (e.g., client) programs. As used herein, a computer refers to a general purpose computer comprising a central processing unit and a memory.

The invention concerns a competitive rewards database system and method of administration. The system is operable to receive member data from at least one member computer via a data feed and automatically map the member data prior to incorporation into the competitive rewards database. The system is preferably coupled to a plurality of member human resources management systems (i.e., computer systems) and receives automatic data feeds of raw member data on a regular basis.

The term "member computer system" as used herein refers to a member's human resources management systems (HRMS). A typical member HRMS is implemented with a proprietary software package and one or more computer. The implementation, configuration, maintenance and operation of a computer based HRMS is well known to those skilled in the art.

Figure 1:
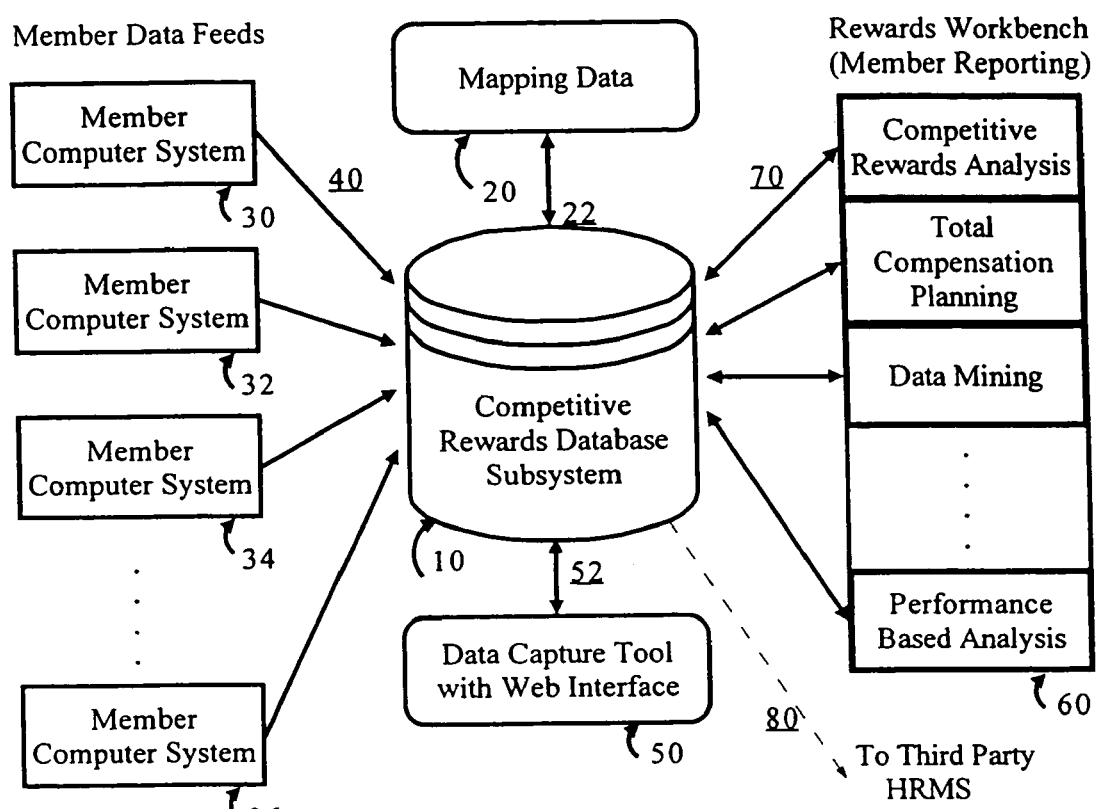
FIG. 1 is a general block diagram showing the basic components of computer system in accordance with the invention.

FIG. 1 shows a block diagram of a computer system in accordance with the invention. The computer system has a competitive rewards database subsystem 10 (associated with at least one computer) operable store data such as base pay data, long term incentive pay data and annual incentive pay data. Other data elements can include any human resource management system data element, incentive data, perquisite data and/or benefit plan provision data and the like. Mapping data 20 provides a mechanism for automatically mapping raw member data prior to incorporation into the competitive rewards database as discussed in more detail below. Mapping data 20 is generally coupled to the competitive rewards database subsystem 10 as shown generally by arrow 22 (e.g., via Lan, Wan, intranet, extranet or the like).

The competitive rewards database subsystem 10 is preferably coupled to at least one member computer system. See blocks 30, 32, 34 and 36. Data communication (e.g., data feeds) between member computer systems 30, 32, 34 and 36 and the competitive rewards database subsystem 10 are shown generally by arrows 40. Data communications in association with database reporting functions are shown generally by arrows 70. Data communications in association with data capture tool 52 is shown generally by arrow 52. Data communications between various portions of the system are preferably carried out via a data network such as the Internet. It is understood that other data network configurations are compatible with the invention (e.g., Lan, Wan, intranet, extranet or the like). It is also understood that enhanced security can be provided via firewalls, secure servers and the like.

In the case of the Internet, data communications often traverse a series of intermediate network nodes prior to reaching the desired destination. Arrows 40, 52 and 70 do not suggest a direct physical connection between the member computer systems and the competitive rewards database subsystem and encompass typical Internet communications (a connectionless, best-efforts packet-based system).

It is understood that other components may be required to fully implement communications between the member computer systems 30, 32, 34 and 36 and the competitive rewards database subsystem such as firewalls, routers, policy servers, Web servers, application servers, enterprise management systems, data communications channels (e.g. communications equipment, leased data lines and the like), switches, encryption products and/or gateways and the like. Configuration of the required hardware and software to implement data communication in accordance with the invention is well known to those skilled in the art.

A data capture tool 50 is coupled to the competitive rewards database subsystem. The data capture tool is preferably an Internet World Wide Web based "smart" tool to capture HR and Line Manager input on benchmark global job matches. Preferably, the data capture tool is populated with appropriate employee data (based on data in the competitive rewards database) according to reporting relationships. Line Managers can then advantageously review data for each employee they supervise.

A rewards workbench is 60 is coupled to the competitive rewards database subsystem. The rewards workbench is an analytic tool to access to data contained in the competitive rewards database subsystem. The rewards workbench is preferably operable to query the competitive rewards database and provide various reports relevant to competitive rewards analysis, total compensation planning, data mining and performance based analysis.

The data capture tool 50 and rewards workbench 60 are preferably implemented via with one or more HTML servers hosting an Internet Web site. There are many varieties of commercially or publicly available World Wide Web server software packages which are compatible with the invention (e.g., Apache, IBM WebSphere products, NETSCAPE Enterprise, Microsoft Windows IIS Server and the like) all of which can be implemented with commonly available hardware from vendors such as IBM, Hewlett Packard, Compaq, Dell, Sun and numerous others that are known to those skilled in the art.

Members wishing to access the data capture tool 50 or rewards workbench 60 will typically use a network processing device (not shown) coupled to the external data network (e.g., the Internet). Two or more network devices (e.g., a network processing device and competitive rewards database subsystem 10) as disclosed herein are "coupled" so long as data communication between the devices is possible (e.g., hard wired data communication, wireless data communications and the like). Typical network processing devices include, but are not limited to, personal computers (portable or desktop), personal digital assistants (PDA), Browser phones, 2-way pagers or the like. Network processing devices also include browser software or the like for providing a user interface and enabling communication with the external data network (e.g., Microsoft Internet Explorer, Netsacape Communicator, mini-browsers or the like).

In the context of the Internet, the network processing device and the competitive rewards database subsystem 10 communicate via TCP/IP protocol (Transmission Control Protocol over Internet Protocol). Each is network addressable in that it has a specific IP address (e.g., a 32-bit address defined by the Internet Protocol usually represented in dotted decimal notation) which is used to route data between the devices. It is also understood that other data networks using various network protocols are suitable for use in accordance with the invention.

Figure 2:
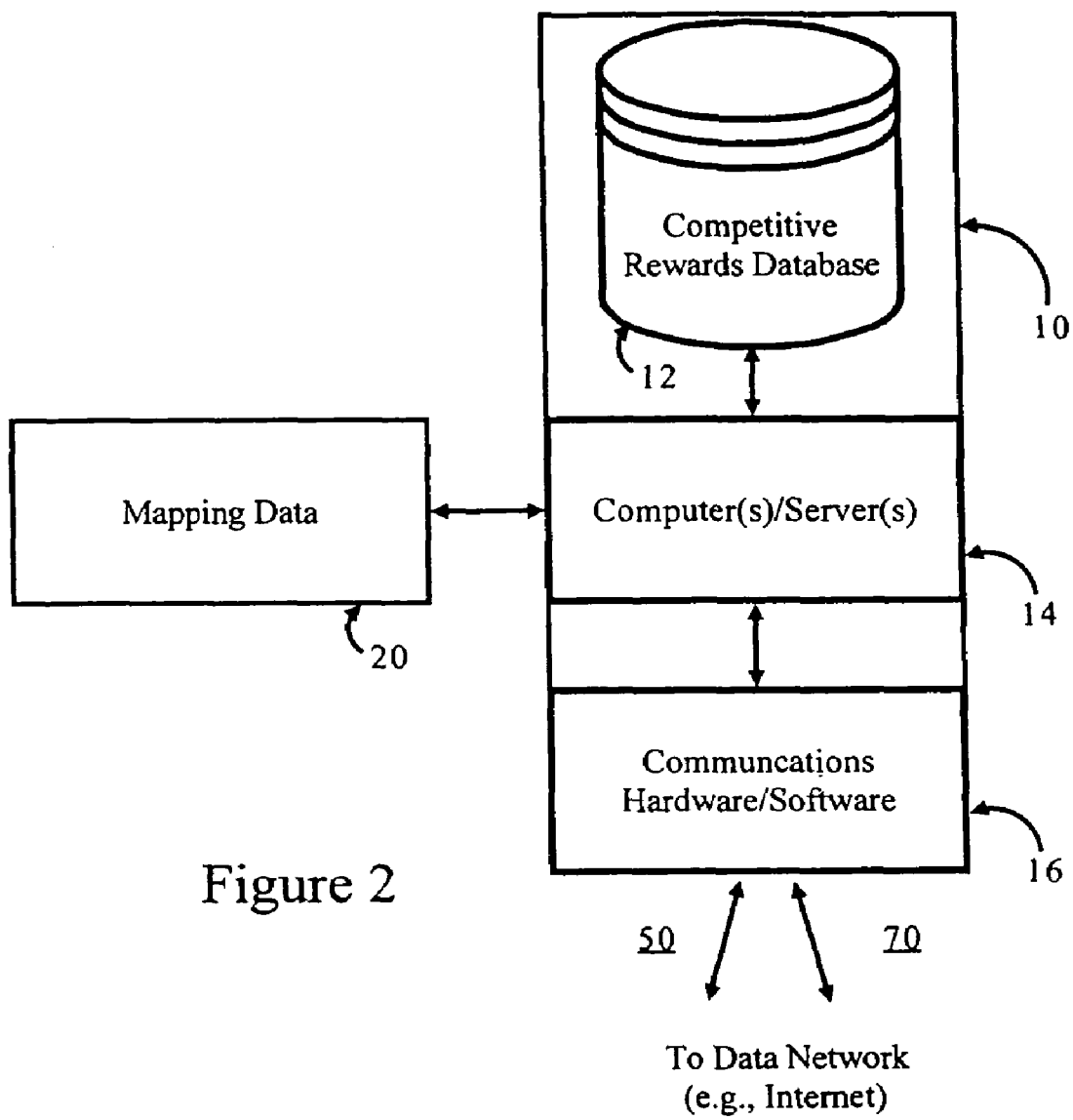
FIG. 2 is a block diagram showing the basic components of the competitive rewards database subsystem in accordance with the invention.

FIG. 2 shows a block diagram of the competitive rewards database subsystem 10. Competitive rewards database 12 is generally operable to store data acquired from the member systems. However, raw data from the member computer systems must be mapped, in accordance with mapping data 20, prior to incorporation into the competitive rewards database 12 as discussed in more detail below. Computer(s)/server(s) 14 are generally operable to communication with the member computer systems via communications hardware/software 16. The interconnection of computers, servers, communication equipment and the like in accordance with the invention is well within the grasp of those skilled in the art. For example, the competitive rewards database subsystem 10 can be implemented via a Lan, Wan, intranet, extranet or the like.

Figure 3:
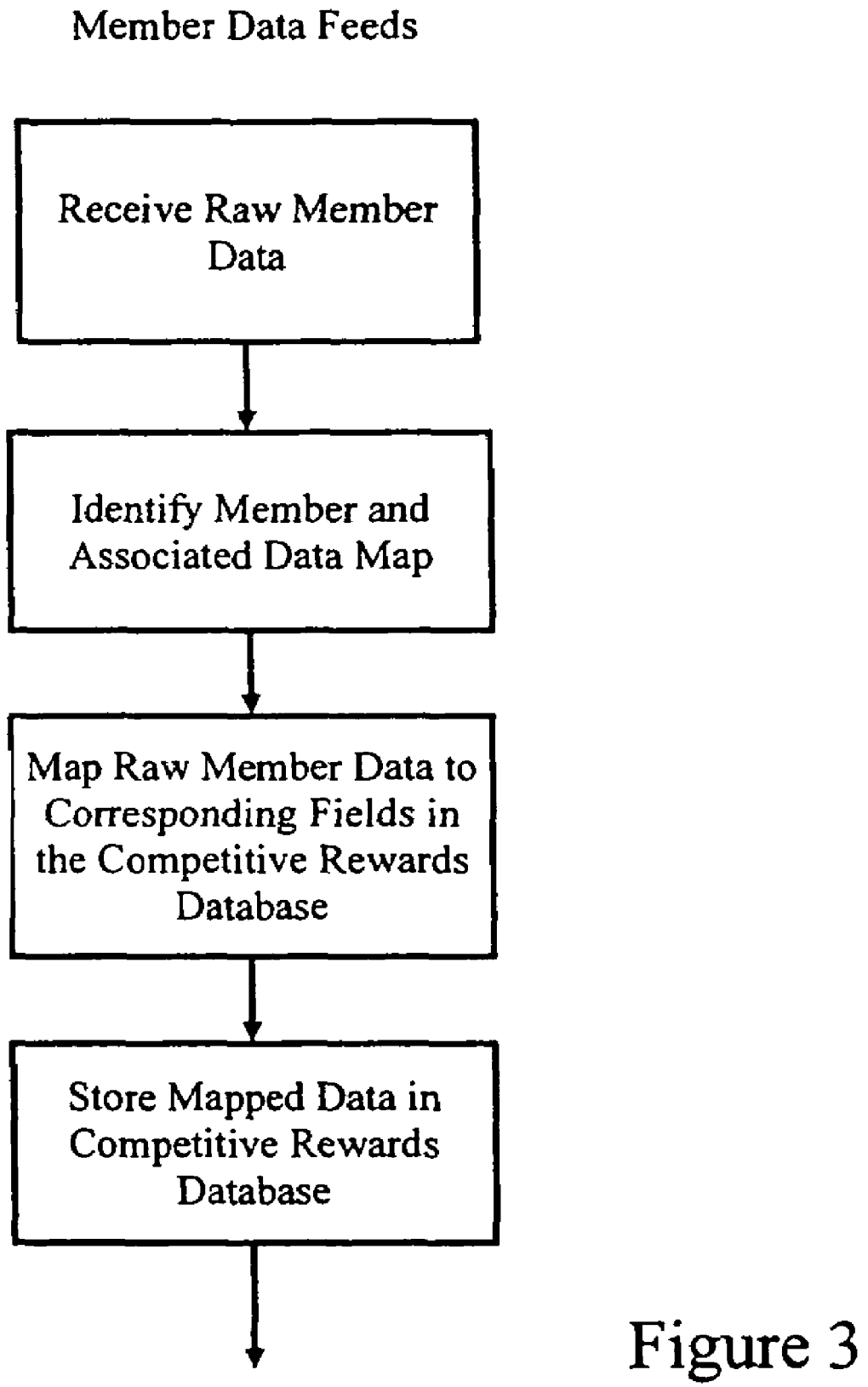
FIG. 3 is flow chart illustrates operation of a computer system with respect to member data feeds in accordance with the invention.

FIG. 3 generally illustrates operation of a computer system with respect to member data feeds in accordance with the invention. Preferably, each of the member computer systems 30, 32, 34 and 36 are configured to automatically transfer raw data on a somewhat regular or periodic basis (e.g., daily, weekly, monthly . . . ). In the alternative, the competitive rewards database system 10 can be configured to poll each of the member computer systems. Raw data can be transferred via any communication protocol, including but not limited to HTTP, FTP, GOPHER, NEWS, NNTP, MAILTO and the like.

The invention contemplates integration with a plurality of proprietary HRMS. Each member computer system may have a different raw data format. Preferably, each member has associated data map stored in the competitive rewards database subsystem. See FIGS. 1 and 2, block 20. The data map generally correlates each data element in the raw data with corresponding locations in competitive rewards database. Some of the raw data may be directly copied into the competitive rewards database. Other portions of the raw data may be translated, scaled, re-formatted, re-calculated and/or adjusted as necessary for compatibility with the format of the competitive rewards database. Once the raw data is mapped, it is stored in the competitive rewards database.

FIG. 4 shows an exemplary portion of a data mapping table (incorporated into mapping data 20). It is generally understood that raw member data from a member's HRMS will contain a plurality of records. FIG. 4 shows the data mapping for an excerpt of a HRMS database record including information related to a single employee.

In a preferred embodiment, all of the raw data is mapped to a corresponding field in the competitive rewards database. In an alternate embodiment, some of the raw data can be omitted from the competitive rewards database (e.g., employee name, social security number and the like).

Some portions of the raw data are simply mapped into appropriate locations in the competitive rewards database. As stated above some of the raw data may be translated, scaled, re-formatted, re-calculated and/or adjusted as necessary for compatibility with the format of the competitive rewards database. For example, some HRMS may specify a given employee position by a text string (e.g., ASCII code). The competitive rewards database may be advantageously implemented with a plurality of numeric codes (i.e., job codes). Translation of text strings to numeric codes as well as general implementation of a data mapping table in accordance with the invention based on the foregoing disclosure is well within the scope of those skilled in the art.

In operation, each of the member computer systems transmits raw data to the competitive rewards database system. The raw data is mapped and re-formatted as necessary and is incorporated into the competitive rewards database. Data capture tool 50 can then be used by members (e.g., HR Managers, Line Managers) to view portions of the competitive rewards database populated with appropriate employee data according to reporting relationships. The Manager can then review data for each employee they supervise. Preferably, menu-driven options are provided thereby enabling the Manager to "tag" employees—by function, discipline, level, and scope—and flag high-performers. Preferably, on-line help is available to guide managers through the matching process. In a preferred aspect of the invention, HR and Line Managers can review and update the mapping and competitive rewards database information as part of on-going HR processes.

Thus, the invention advantageously provides an up-to-date mapping of employees to benchmarks established by all members of the competitive rewards database system (e.g., function, discipline, level). This promotes Manager acceptance of market data and ensures robust, high-quality data.

Rewards workbench 60 provides members with a comprehensive analytic tool operable to access data contained in the competitive rewards database subsystem. The rewards workbench is preferably operable to: query prevalence of reward practices and plan provisions, compare member reward values to specific comparator groups, develop market reference data from the competitive rewards database, model and develop base pay structure, analyze cost implications, conduct data mining analyses on member's own data, and generate other custom real-time analyses on the competitive rewards database. The generation of various reports and analysis based on competitive rewards database information is well within the scope of those skilled in the art.

In a preferred embodiment, the rewards workbench provides for the formatting and export of formatted member data for submission to surveys. This information can be automatically transmitted to a third party HRMS. See FIG. 1, reference number 80.

Rewards workbench 60, advantageously provides direct access to a robust data source to conduct a wide range of sophisticated analyses. This improves efficiency of survey submission process by leveraging initial benchmark matching and validation efforts (using the data capture tool). Rewards workbench 60 also allows electronic feed of competitive rewards data to other specialized human resources systems.

It is understood that some of the data contained in the competitive rewards database is not available to all users. For example, each member preferably can access all of data contained in the competitive rewards database derived from their raw data. Each member can also access a subset of the data contained in the competitive rewards database derived from other member raw data (e.g., compiled statistics summarizing the data received from multiple members). However, individual employee names, social security numbers, personal data, billing information are not made available to other members. In general, access to member data is restricted as needed for compliance with international, federal, state and local regulations (e.g., the timing of release of new data, the level of detail of the data released, and the release of data with respect to various geographic regions).

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed is:

1. A competitive rewards database system comprising:
   a) competitive rewards database operative to collect through one or more data feeds raw competitive rewards data comprising at least one of base pay data, long term incentive pay data, annual incentive data, and benefit plan provision data for employees of an entity and competitive rewards data from a plurality of sources other than the entity;
   b) data mapping table for automatically mapping the raw competitive rewards data prior to incorporation into the competitive rewards database by mapping the raw competitive rewards data to benchmarks comprising job function, discipline or scope;
   c) a computer system, coupled to the competitive rewards database via a data communications channel, operative to provide the competitive rewards data for employees of the entity to the competitive rewards database on behalf of the entity; and
   d) a rewards workbench, configured to query the competitive rewards database in support of analysis of the mapped competitive rewards data, wherein the analysis comprises a comparison of the competitive rewards data to at least one of the benchmarks.

2. The system of claim 1 wherein the competitive rewards data contains at least one calculated data value.

3. The system of claim 1 further comprising a data capture tool configured to provide remote access to at least a portion of the competitive rewards database.

4. The system of claim 1 wherein the rewards workbench is coupled to a data network and is configured to provide remote access to at least a portion of the competitive rewards database.

5. The system of claim 1 wherein the rewards workbench is configured to automate data feeds from the competitive rewards database to at least one third party human resources management system.

6. A method for administering a competitive rewards database comprising:
   a) collecting through one or more data feeds raw competitive rewards data comprising at least one of base pay data, long term incentive pay data, annual incentive pay data, and benefit plan provision data for employees of an entity and competitive rewards data from a plurality of sources other than the entity;
   b) automatically mapping the raw competitive rewards data for incorporation into the competitive rewards database by mapping the raw competitive rewards data to benchmarks comprising job function, discipline, or scope;
   c) incorporating the mapped competitive rewards data into the records of the competitive rewards database;
   d) analyzing the mapped competitive rewards data by performing a comparison of the competitive rewards data to one of the benchmarks maintained by the competitive rewards database; and
   e) generating a presentation of results for the competitive rewards analysis.

7. The method of claim 6 wherein the competitive rewards data for employees of the entity comprises human resources (HR) management system data.

8. The method of claim 6 wherein the step of mapping the raw competitive rewards data comprises translating, scaling, reformatting or calculating portions of the raw competitive rewards data for compatibility with the benchmarks.

9. The method of claim 6 further comprising the step of using a data capture tool to adjust the mapping of the raw competitive rewards data.

10. The method of claim 6 further comprising the step of using a rewards workbench to query the competitive rewards database in support of analyses of the mapped competitive rewards data, the analyses comprising at least one selected from a group comprising evaluation of prevalence of reward practices and plan provisions, comparison of member reward values to specific comparator groups, development of market reference data, model and development of base pay structure, analyses of competitive rewards cost implications, and data mining analyses.

11. The method of claim 6 further comprising the step of using a rewards workbench to automate a data feed between the competitive rewards database and at least one third party human resources management system that is not associated with the entity, thereby supporting a submission of certain mapped competitive rewards data in the form of a survey to the third party human resources management system.

12. The method of claim 6 wherein the step of analyzing the mapped competitive rewards data further comprises a total compensation planning analysis or a performance-based analysis.

13. The method of claim 6, wherein the step of receiving the raw competitive rewards data comprises receiving the raw competitive rewards data at the competitive rewards database on a periodic basis.

14. The method of claim 6, wherein the step of receiving the raw competitive rewards data comprises:
   sending a polling signal from the competitive rewards database to a computer system operated on behalf of the entity; and
   responsive to the polling signal, transmitting the competitive rewards data for the employees of the entity from the computer system to the competitive rewards database.

15. The method of claim 6, wherein the data mapping step comprises using a data mapping table to map without manual intervention the raw competitive reward data based on benchmark global job matches.

16. The method of claim 6, wherein the step of generating a presentation of results comprises generating a report in response to completing the analysis of the competitive rewards data.

17. The method of claim 6, wherein the step of analyzing the mapped competitive rewards data generates an up-to-date mapping for competitive rewards data of the employees for the entity to at least one of the benchmarks.

18. A method for managing competitive rewards data for an entity, comprising:
   collecting the raw competitive rewards data through one or more data feeds for incorporation in a database, the raw competitive rewards data comprising at least one of base pay data, long term incentive pay data, annual incentive pay data, and benefit plan provision data for employees of the entity and competitive rewards data from a plurality of sources other than the entity;
   using a data mapping table to automatically map the raw competitive rewards data for incorporation into the database by mapping the raw competitive rewards data to a plurality of employment-related benchmarks;
   storing the mapped competitive rewards data in a plurality of records of the database;

completing an analysis of the mapped competitive rewards data for one or more of the employees by comparing the competitive reward data to one of the benchmarks; and generating a report presenting results of the analysis.

19. The method of claim 18 wherein the competitive rewards data for employees of the entity comprises human resources (HR) management system data.

20. The method of claim 18, where the step of completing an analysis further comprises performing at least one of a group comprising evaluation of prevalence of reward practices and plan provisions, comparison of member reward values to specific comparator groups, development of market reference data, model and development of base pay structure, analyses of competitive rewards cost implications, and data mining analyses.

21. The method of claim 18 further comprising the step of providing a data feed between the database and at least one third party human resources management system that is not associated with the entity, thereby supporting a submission of certain mapped competitive rewards data in the form of a survey to the third party human resources management system.

22. The method of claim 18 wherein the step of completing an analysis of the mapped competitive rewards data further comprises a competitive rewards analysis, a total compensation planning analysis or a performance-based analysis.

23. The method of claim 18, wherein the step of obtaining the raw competitive rewards data comprises receiving the raw competitive rewards data at the database on a periodic basis.

24. The method of claim 18, wherein the step of obtaining the competitive rewards data for the employees of the entity comprises:

sending a polling signal from the database to a computer system operated on behalf of the entity; and responsive to the polling signal, transmitting the competitive rewards data for the employees of the entity from the computer system to the database.

25. The method of claim 18, wherein the data mapping step comprises using a data mapping table to map without manual intervention the raw competitive reward data based on benchmark global job matches.

* * * * *